United States Patent
Zardus et al.

(10) Patent No.: US 8,544,715 B2
(45) Date of Patent: Oct. 1, 2013

(54) REPAIRING A FRICTION STIR WELDED ASSEMBLY

(75) Inventors: Paul M. Zardus, Royal Oak, MI (US); Pei-Chung Wang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 879 days.

(21) Appl. No.: 12/349,058

(22) Filed: Jan. 6, 2009

(65) Prior Publication Data

US 2010/0173123 A1 Jul. 8, 2010

(51) Int. Cl.
B23K 31/00 (2006.01)

(52) U.S. Cl.
USPC .......... 228/119; 228/112.1; 228/135; 228/136; 228/2.1

(58) Field of Classification Search
USPC .............. 228/112.1, 2.1, 119, 135, 136
See application file for complete search history.

(56) References Cited

U.S. PATENT DOCUMENTS

| | | | | |
|---|---|---|---|---|
| 3,772,957 A | * | 11/1973 | Newton | 411/15 |
| 4,478,543 A | * | 10/1984 | Lyon | 411/34 |
| 5,253,965 A | * | 10/1993 | Angel | 411/82 |
| 6,386,419 B2 | * | 5/2002 | Coletta et al. | 228/2.3 |
| 2005/0220533 A1 | * | 10/2005 | Prichard | 403/282 |
| 2006/0175381 A1 | * | 8/2006 | Wang et al. | 228/112.1 |

* cited by examiner

*Primary Examiner* — Maria Veronica Ewald
*Assistant Examiner* — Megha Mehta

(57) ABSTRACT

A method of repairing and a repaired friction stir welded assembly is disclosed. The friction stir welded assembly repair may include the steps of: drilling a hole through a discrepant portion of the friction stir welded assembly; sliding a mandrel head and a tubular rivet body of a rivet assembly through the hole; seating a rivet head and an adhesive/sealer washer against one of the first workpiece and the second workpiece, with the adhesive/sealer washer located between portions of the rivet head and body and the friction stir welded assembly; pulling a mandrel to cause the mandrel head to create an upset portion of the rivet body engaging the friction stir welded assembly; and curing the adhesive/sealer washer.

9 Claims, 4 Drawing Sheets

REPAIRING A FRICTION STIR WELDED ASSEMBLY

BACKGROUND OF INVENTION

The present invention relates generally to friction stir welded assemblies and in particular to repairs for friction stir welded assemblies.

Friction stir welding is often employed to joint metal workpieces together where it is desirable to retain the original metal characteristics after the joining process is complete. This is possible because the material is not melted during the friction stir welding process and usually no filler material is used. During this welding process a probe is rotated while being moved along a joint line. The frictional heat causes the affected material to soften, but not melt. This area of deformed material is called the stir zone.

Friction stir welding operations are often conducted in a highly repetitive operation and, unfortunately, sometimes problems or variations occur in the control or execution of the process and discrepant welds are produced. Scrapping the workpieces with the discrepant welds is undesirable for cost reasons. However, the welded assembly cannot be used unless the joint strength meets the requirements for the particular assembly.

SUMMARY OF INVENTION

An embodiment contemplates a method of repairing a friction stir welded assembly having a first workpiece joined to a second workpiece, the method comprising the steps of: drilling a hole through a discrepant portion of the friction stir welded assembly; sliding a mandrel head and a tubular rivet body of a rivet assembly through the hole; seating a rivet head and an adhesive/sealer washer against one of the first workpiece and the second workpiece, with the adhesive/sealer washer located between portions of the rivet head and body and the friction stir welded assembly; pulling a mandrel to cause the mandrel head to create an upset portion of the rivet body engaging the friction stir welded assembly; and curing the adhesive/sealer washer.

An embodiment contemplates a repaired component assembly that includes a first workpiece, a second workpiece friction stir welded to the first workpiece, with the friction stir weld including a discrepant portion, and a rivet assembly. The rivet assembly extends through a hole drilled through the discrepant portion of the friction stir weld, with the rivet assembly including a rivet head adjacent to the workpiece and an adhesive/sealer washer secured and sealingly engaged between the rivet head and the friction stir weld adjacent to the discrepant portion.

An advantage of an embodiment is that the joint strength for a discrepant friction stir weld is improved, thus reducing the potential need to scrap the particular component assembly. The rivet bonded joint reduces the overall costs of joining workpieces employing friction stir welding since the amount of scrapage due to discrepant welds is minimized. And, such a repair to a discrepant friction stir weld can be accomplished even when one side of the component assembly is inaccessible after the welding procedure. Moreover, such a rivet-bonded joint reduces the potential for producing squeaking noise from the joint during use of the component assembly.

DETAILED DESCRIPTION

Figure 1:
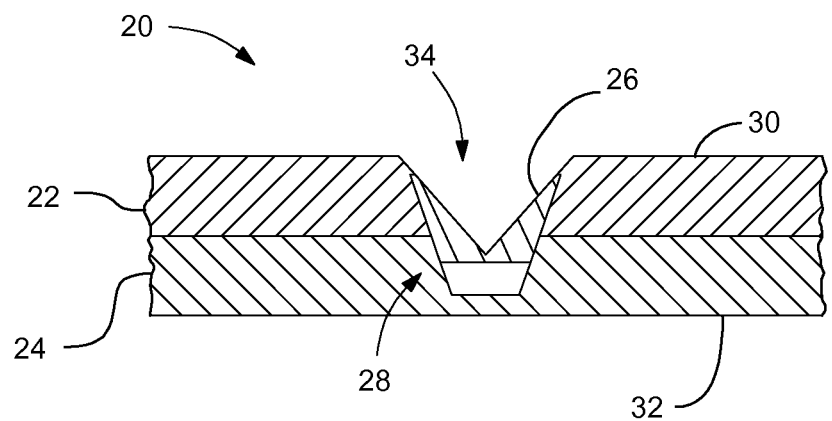
FIG. 1 is a schematic view of a discrepant friction stir weld in a component assembly.

Referring to FIG. 1, a component assembly 20 including a first workpiece 22 and a second workpiece 24, having undergone a friction stir welding process, is shown. The particular friction stir welding process has produced a discrepant friction stir weld 26 in a stir zone 28 adjacent to a gap 34 in the first workpiece 22 left over from the friction stir welding process. In addition, the first workpiece 22 may be welded to the second workpiece 24 in such a way that the component assembly has an accessible side 30 and an opposed inaccessible side 32, which is not accessible after the welding operation. While two workpieces are shown friction stir welded together in the figures, other numbers of workpieces may be friction stir welded together, such as, for example, three sheets, while still remaining within the scope of the present invention.

Figure 2:
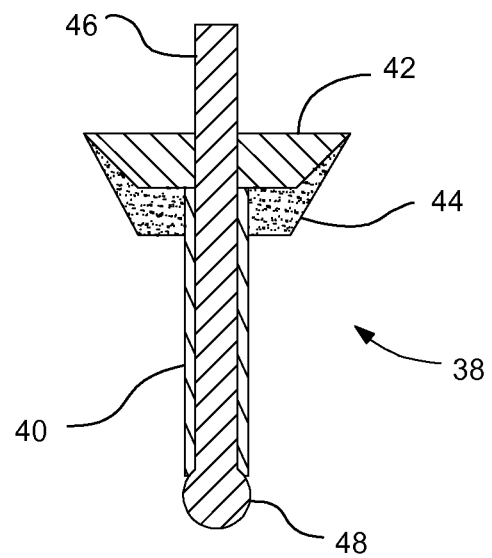
FIG. 2 is a schematic view of a single-sided (blind) rivet assembly.

FIG. 2 illustrates a single-sided (blind) rivet assembly 38 that is employed in the friction stir weld repair. The blind rivet assembly 38 includes a tubular rivet body 40 engaging a rivet head 42. A tapered adhesive/sealer washer 44 is located around the underside of the rivet head 42 and a portion of the rivet body 40. The washer 44 is flexible enough to allow it to flex as the rivet assembly 38 is located in the component assembly (discussed more below). The adhesive/sealer may be a polymer based adhesive/sealer that can be cured at elevated or ambient temperatures. The adhesive/sealer washer may be made of, for example, adhesive number 5087 by Henkel—although other suitable adhesive/sealers may be employed instead, if so desired. A mandrel 46 extends through the rivet body 40 and rivet head 42 and includes a mandrel head 48 that engages the rivet body 40 on an end opposite to the rivet head 42.

Figure 3:
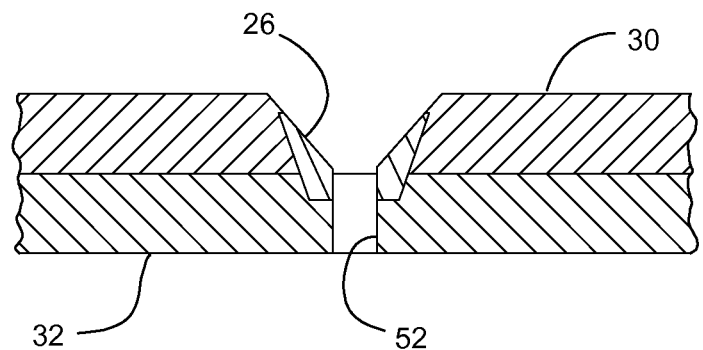
FIG. 3 is a view similar to FIG. 1, but illustrating a step in the process of repairing the discrepant friction stir weld.

FIG. 3 illustrates a step in the repair process for repairing the discrepant friction stir weld. A hole 52 is drilled—from the accessible side 30 through to the inaccessible side 32—through the location of the discrepant friction stir weld 26. The hole 52 is drilled slightly larger than the mandrel head and rivet body diameters.

Figure 4:
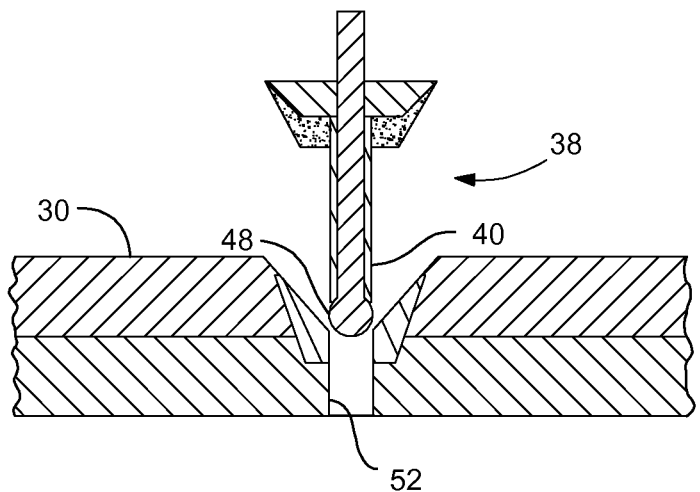
FIG. 4 is a schematic view illustrating another step in the process of repairing the discrepant friction stir weld.
Figure 5:
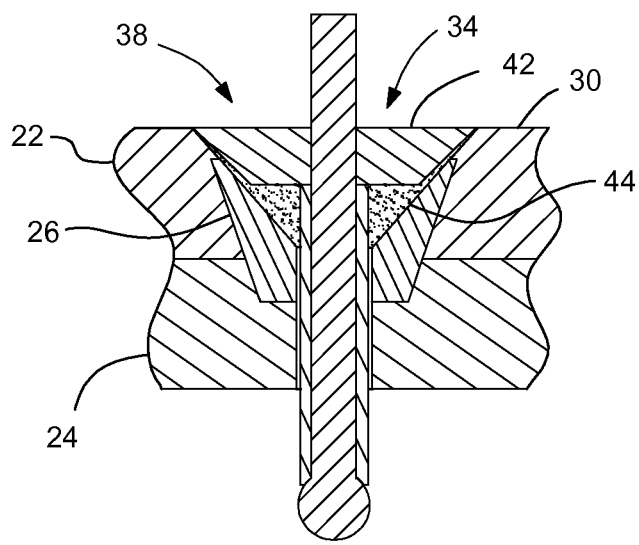
FIG. 5 is a schematic view illustrating yet another step in the process of repairing the discrepant friction stir weld.

FIG. 4 illustrates the next step in the repair process, with the blind rivet assembly 38 located on the accessible side 30 of the component assembly, and with the mandrel head 48 and rivet body 40 oriented to telescopically slide into the hole 52. The blind rivet assembly 38 is then slid into the hole until the rivet head 42 seats in the gap 34 of the discrepant friction stir weld 26, as shown in FIG. 5. The adhesive seal/washer 44 is flexible enough to allow the rivet head 42 to seat in the gap 34 and deforms to fill the area between the rivet head 42 and the workpieces 22, 24. Also, the diameter of the rivet head 42 may be sized to fill the nominal width of the gap 34 and seat relatively flush with the surface of the accessible side 30 of the first workpiece 22.

Figure 6:
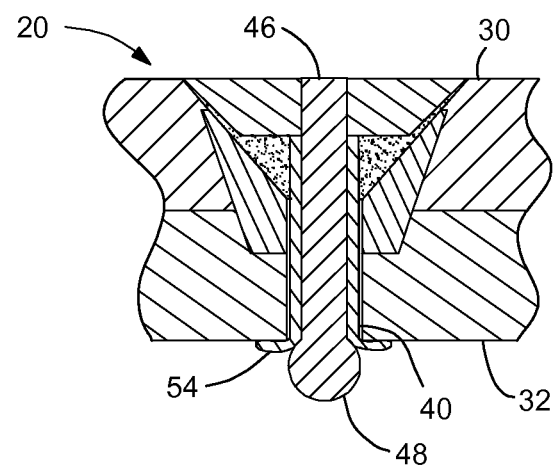
FIG. 6 is a is a schematic view illustrating a further step in the process of repairing the discrepant friction stir weld.

A conventional tool (not shown) is then used to pull the mandrel 46 through a portion of the assembly, thus causing the mandrel head 48 to create an upset portion 54 of the rivet body 40 that is secured against the inaccessible side 32 of the component assembly 20, as shown in FIG. 6. The end of the mandrel 46 may be broken off so it is essentially flush with the surface of the accessible side 30.

Figure 7:
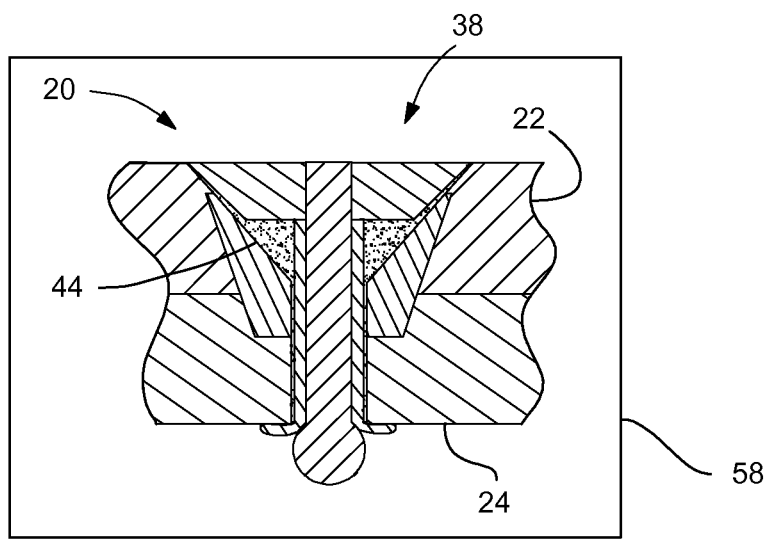
FIG. 7 is a schematic view illustrating the component assembly in an oven.

The component assembly 20, with blind rivet assembly 38, may be cured in an oven, such as a paint oven 58, as shown in FIG. 7, allowing the adhesive/sealer washer 44 to expand and fill any voids between the blind rivet assembly 38 and the workpieces 22, 24 and bonding to the parts. The curing in the paint oven 58 may be, for example, at about 180 degrees Celsius for about 20 minutes. Alternatively, a different method for causing the adhesive/sealer to cure may be used instead, if so desired. The component assembly 20 can then be used for its originally intended purpose, with the friction stir weld having improved joint strength versus the discrepant friction stir weld.

Figure 8:
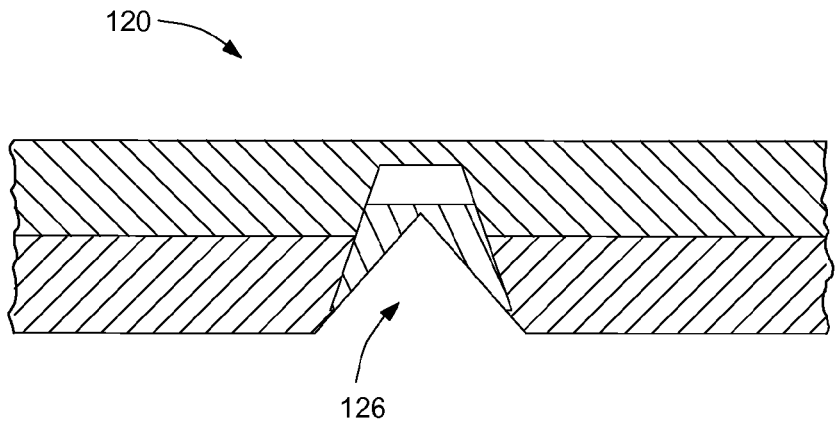
FIG. 8 is a schematic view of a discrepant friction stir weld in a component assembly where a repair can be performed according to a second embodiment.
Figure 9:
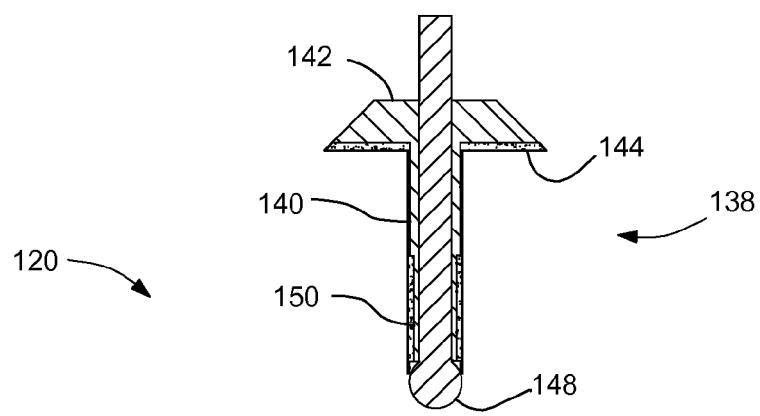
FIG. 9 is a schematic view similar to FIG. 4, but illustrating process steps according to the second embodiment.
Figure 10:
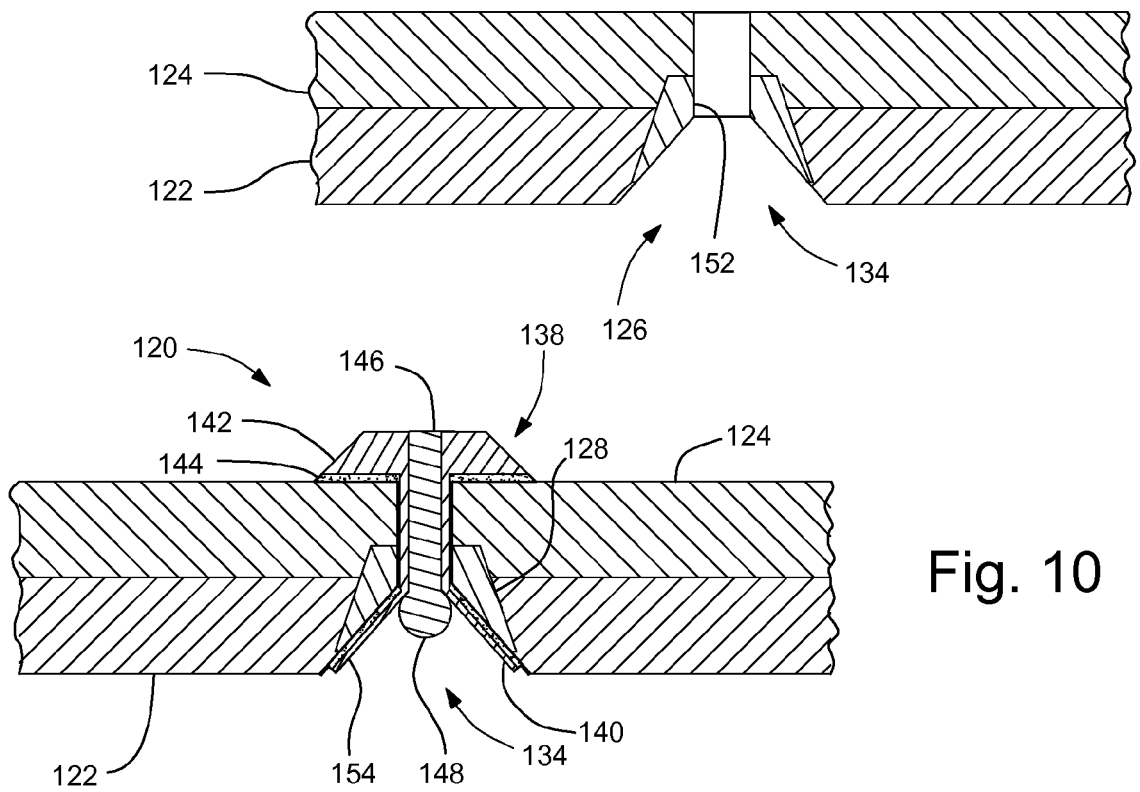
FIG. 10 is a schematic view similar to FIG. 6, but illustrating process steps according to the second embodiment.

FIGS. 8-10 illustrate a second embodiment of the invention. Since this embodiment is similar to the first, similar reference numerals will be employed for similar elements, but using 100-series numbers. In this embodiment, access is available to the other side of the component assembly 120 at the location of the discrepant friction stir weld 126 (see FIG. 8).

Again, a hole 152 is drilled through the workpieces 122, 124 at the location of the discrepant friction stir weld 126 (FIG. 9). A rivet assembly 138 is again positioned to slide into the hole 152, but from the side opposite the gap 134 (FIG. 9). In this embodiment, the rivet assembly 138 is somewhat different than in the first embodiment. The rivet assembly 138 before installation is shown in FIG. 9. The tubular rivet body 140 now includes a step down to a thinner portion 150 that extends to the mandrel head 148. Also, the rivet head 142 is shaped to rest on the surface rather than be recessed in the surface of the component assembly 120. In addition, the adhesive/sealer washer 144 now extends along the tubular rivet body 140 to the mandrel head 148 in addition to extending under the rivet head 142.

A conventional tool (not shown) is then used to pull the mandrel 146 through a portion of the assembly, thus causing the mandrel head 148 to create an upset portion 154 of the rivet body 140 that is secured in the gap 134, against the stir zone 128 and the first workpiece 122, as shown in FIG. 10, with sealer/adhesive sandwiched between them. The end of the mandrel 146 may be broken off so it is essentially flush with the surface of the rivet head 142. The component assembly 120, with blind rivet assembly 138, may be cured in an oven, such as a paint oven, allowing the adhesive/sealer washer 144 to expand and fill any voids between the blind rivet assembly 138 and the workpieces 122, 124 and bond to the parts.

While certain embodiments of the present invention have been described in detail, those familiar with the art to which this invention relates will recognize various alternative designs and embodiments for practicing the invention as defined by the following claims.

What is claimed is:

1. A method of repairing a friction stir welded assembly having at least a first workpiece joined to a second workpiece, the method comprising the sequential steps of:
   (a) drilling a hole through a discrepant portion of a friction stir weld of the friction stir welded assembly;
   (b) sliding a mandrel head and a tubular rivet body of a rivet assembly through the hole;
   (c) seating a rivet head and a washer made of at least one of an adhesive and a sealer against one of the first workpiece and the second workpiece, with the washer located between portions of the rivet head and one of the first and second workpieces and between the tubular rivet body and the friction stir welded assembly prior to creating an upset portion of the rivet body;
   (d) pulling a mandrel to cause the mandrel head to create the upset portion of the rivet body engaging the friction stir welded assembly; and
   (e) curing the washer.

2. The method of claim 1 wherein step (a) is further defined by the first workpiece having an accessible side and the second workpiece having an opposed inaccessible side, wherein the hole is drilled from the accessible side through the inaccessible side.

3. The method of claim 2 wherein step (b) is further defined by the rivet assembly being a blind rivet assembly, with the mandrel head and the rivet body being slid through the hole from the accessible side.

4. The method of claim 1 wherein step (e) is further defined by the curing being activated by placing the friction stir welded assembly in a hot oven.

5. The method of claim 1 wherein step (c) is further defined by the washer being a polymer based adhesive and sealer.

6. A method of repairing a friction stir welded assembly having a first workpiece joined to a second workpiece to define an accessible side on the first workpiece and an opposed inaccessible side on the second workpiece, the method comprising the sequential steps of:
   (a) drilling a hole through a discrepant portion of a friction stir weld of the friction stir welded assembly from the accessible side through to the inaccessible side;
   (b) sliding a mandrel head and a tubular rivet body of a blind rivet assembly through the hole, from the accessible side to the inaccessible side;
   (c) seating a rivet head and a washer, made of at least one of an adhesive and a sealer, in a gap formed by the friction stir welding, with the washer located between portions of the rivet head and one of the first and second workpieces and between the tubular rivet body and a stir zone of the friction stir welded assembly prior to creating an upset portion of the rivet body;
   (d) pulling a mandrel to cause the mandrel head to create the upset portion of the rivet body engaging the friction stir welded assembly on the inaccessible side; and
   (e) curing the washer.

7. The method of claim 6 wherein step (e) is further defined by the curing being activated by placing the friction stir welded assembly in a hot oven.

8. The method of claim 7 wherein step (c) is further defined by the washer being made of a polymer based adhesive and sealer that is cured at an elevated temperature.

9. The method of claim 6 wherein step (c) is further defined by the washer being a polymer based adhesive and sealer.

* * * * *